United States Patent
Etzel et al.

(10) Patent No.: US 12,221,933 B2
(45) Date of Patent: Feb. 11, 2025

(54) CONTROL UNIT AND METHOD FOR OPERATING A HYBRID DRIVE HAVING AN INTERNAL COMBUSTION ENGINE WITH REDUCED DRAG TORQUE

(71) Applicant: Bayerische Motoren Werke Aktiengesellschaft, Munich (DE)

(72) Inventors: Michael Etzel, Munich (DE); Michael Friedrich, Eching (DE); Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 660 days.

(21) Appl. No.: 17/294,732

(22) PCT Filed: Nov. 13, 2019

(86) PCT No.: PCT/EP2019/081092
§ 371 (c)(1),
(2) Date: May 18, 2021

(87) PCT Pub. No.: WO2020/114736
PCT Pub. Date: Jun. 11, 2020

(65) Prior Publication Data
US 2022/0017066 A1     Jan. 20, 2022

(30) Foreign Application Priority Data

Dec. 4, 2018 (DE) .................. 10 2018 130 886.8
Jan. 10, 2019 (DE) .................. 10 2019 100 501.9
Mar. 26, 2019 (DE) .................. 10 2019 107 775.3

(51) Int. Cl.
*F02D 13/08*     (2006.01)
*B60K 6/24*     (2007.10)
(Continued)

(52) U.S. Cl.
CPC ............... *F02D 13/08* (2013.01); *B60K 6/24* (2013.01); *B60K 6/26* (2013.01); *B60K 6/36* (2013.01);
(Continued)

(58) Field of Classification Search
CPC ...... F02D 13/08; F02D 13/0203; F02D 13/06; F02D 2200/101; F02D 2200/503;
(Continued)

(56) References Cited

U.S. PATENT DOCUMENTS 5,461,289 A    10/1995   Adler et al.
5,725,064 A    3/1998   Ibaraki et al.
(Continued)

FOREIGN PATENT DOCUMENTS

DE            41 33 059 A1    4/1993
DE    10 2004 033 141 A1    2/2006
(Continued)

OTHER PUBLICATIONS

International Search Report (PCT/ISA/210) issued in PCT Application No. PCT/EP2019/081092 dated Apr. 6, 2020 with English translation (seven (7) pages).
(Continued)

*Primary Examiner* — Ig T An
*Assistant Examiner* — Christine Nguyen Huynh
(74) *Attorney, Agent, or Firm* — Crowell & Moring LLP

(57) ABSTRACT

A control unit is provided for a hybrid drive that includes an internal combustion engine and an electric machine. The control unit is configured to cause one or more drag torque reduction measures of the internal combustion engine to be terminated in preparation for firing the internal combustion engine. In addition, the control unit is configured to cause the electric machine to at least partly compensate for an increase in the drag torque of the internal combustion engine
(Continued)

caused by the termination of the one or more drag torque reduction measures.

12 Claims, 3 Drawing Sheets

(51) Int. Cl.
| | |
|---|---|
| *B60K 6/26* | (2007.10) |
| *B60K 6/36* | (2007.10) |
| *B60K 6/387* | (2007.10) |
| *B60K 6/48* | (2007.10) |
| *B60K 6/547* | (2007.10) |
| *B60W 10/06* | (2006.01) |
| *B60W 10/08* | (2006.01) |
| *B60W 20/10* | (2016.01) |
| *B60W 20/15* | (2016.01) |
| *F02D 13/02* | (2006.01) |
| *F02D 13/06* | (2006.01) |
| *F02D 41/00* | (2006.01) |
| *F16H 57/00* | (2012.01) |
| *B60W 30/18* | (2012.01) |
| *F16H 57/04* | (2010.01) |

(52) U.S. Cl.
CPC .............. *B60K 6/387* (2013.01); *B60K 6/48* (2013.01); *B60K 6/547* (2013.01); *B60W 10/06* (2013.01); *B60W 10/08* (2013.01); *B60W 20/10* (2013.01); *B60W 20/15* (2016.01); *F02D 13/0203* (2013.01); *F02D 13/06* (2013.01); *F02D 41/0005* (2013.01); *F16H 57/0006* (2013.01); *B60K 2006/268* (2013.01); *B60K 2006/4825* (2013.01); *B60W 30/18127* (2013.01); *B60Y 2200/92* (2013.01); *F02D 2041/0012* (2013.01); *F02D 2200/101* (2013.01); *F02D 2200/503* (2013.01); *F16H 2057/0012* (2013.01); *F16H 57/04* (2013.01)

(58) Field of Classification Search
CPC .............. F16H 57/0006; F16H 57/04; F16H 2057/0012; B60K 6/24; B60K 6/26; B60K 6/36; B60K 6/387; B60K 6/48; B60K 6/547; B60K 2006/268; B60K 2006/4825; B60W 10/06; B60W 10/08; B60W 20/15; B60Y 2200/92
See application file for complete search history.

(56) References Cited

U.S. PATENT DOCUMENTS

| | | | |
|---|---|---|---|
| 6,988,572 B2 * | 1/2006 | Tatara | B60W 20/00 |
| | | | 180/65.26 |
| 2009/0312143 A1 * | 12/2009 | Allgaier | B60K 6/547 |
| | | | 903/946 |
| 2017/0320486 A1 | 11/2017 | Gibson et al. | |
| 2019/0143960 A1 * | 5/2019 | Johri | B60W 10/06 |
| | | | 477/3 |

FOREIGN PATENT DOCUMENTS

| | | |
|---|---|---|
| DE | 10 2015 111 851 A1 | 2/2016 |
| EP | 1 366 944 A2 | 12/2003 |
| EP | 1 562 770 B1 | 8/2009 |

OTHER PUBLICATIONS

German-language Written Opinion (PCT/ISA/237) issued in PCT Application No. PCT/EP2019/081092 dated Apr. 6, 2020 (eight (8) pages).

German-language Search Report issued in German Application No. 10 2019 107 775.3 dated Jan. 10, 2020 with partial English translation (15 pages).

Chinese-language Office Action issued in Chinese Application No. 201980069088.3 dated Nov. 29, 2023 with English translation (15 pages).

* cited by examiner

CONTROL UNIT AND METHOD FOR OPERATING A HYBRID DRIVE HAVING AN INTERNAL COMBUSTION ENGINE WITH REDUCED DRAG TORQUE

BACKGROUND AND SUMMARY OF THE INVENTION

The invention relates to a hybrid drive. In particular, the invention relates to the operation of a hybrid drive in conjunction with drag-torque-reducing measures for a combustion motor of the hybrid drive.

A vehicle with hybrid drive comprises a combustion motor and at least one electric machine, which can each be used individually and/or jointly to impart a drive torque demanded at a transmission of the vehicle. To reduce the drag torque in drag-torque-reduced, unfired or non-fired operation of the combustion motor, one or more drag-torque-reducing measures can be implemented. Exemplary drag-torque-reducing measures are the deactivation of one or more cylinders of the combustion motor or the adaptation of the opening and/or closing angles of the inlet and/or outlet valves of the combustion motor.

The reduction of the drag torque of the combustion motor allows the unfired combustion motor to be concomitantly cranked in an energy-efficient manner, wherein the concomitant cranking of the combustion motor in turn allows energy-efficient and rapid reactivation or commencement of fired operation of the combustion motor. On the other hand, the combustion motor typically cannot be reactivated when the one or more drag-torque-reducing measures are active. The ending of the one or more drag-torque-reducing measures may be associated with a loss of comfort for a user of the hybrid drive.

The present disclosure is concerned with the technical problem of allowing efficient and comfortable drag-torque-reduced, unfired operation of the combustion motor of a hybrid drive (in particular with regard to the ending of the drag-torque-reduced, unfired operation of the combustion motor).

According to one aspect, a control unit for a hybrid drive is described, wherein the hybrid drive may be designed for driving a motor vehicle. The hybrid drive comprises a combustion motor (for example a diesel motor or a gasoline motor) and an electric machine. The control unit may be configured to control the transition of the hybrid drive from drag-torque-reduced, unfired operation of the combustion motor to fired operation of the combustion motor, in particular such that the overall torque of the hybrid drive that is effected in the process varies in a continuous and/or comfortable manner. Here, the fired operation of the combustion motor may involve all cylinders of the combustion motor or may only involve firing of a particular subset of the cylinders of the combustion motor.

In particular, the control unit may be configured to cause one or more drag-torque-reducing measures of the combustion motor to be ended in preparation for a commencement of fired operation of the combustion motor. In other words, the drag torque reduction of the combustion motor may be caused to end, which typically has the result that the combustion motor has an increased drag torque.

The ending of the one or more drag-torque-reducing measures may be a prerequisite for the combustion motor to be able to be fired again. Exemplary drag-torque-reducing measures are the deactivation of one or more cylinders of the combustion motor and/or the adaptation of opening and/or closing angles of at least one inlet and/or outlet valve of the combustion motor.

Furthermore, the control unit may be configured to cause the electric machine to at least partially compensate the increase of the drag torque of the combustion motor that is effected as a result of the ending of the one or more drag-torque-reducing measures. For example, a first additional drag torque of the combustion motor may be effected as a result of the ending of the one or more drag-torque-reducing measures. In other words, the delta between the drag torque of the combustion motor with the one or more drag-torque-reducing measures and the drag torque of the combustion motor without the one or more drag-torque-reducing measures can be referred to as the first additional drag torque. The control unit may be configured to cause the electric machine to increase a torque effected by the electric machine by a value which lies between 50% and 100% of the first additional drag torque.

Thus, by operation of the electric machine, it can be effected that the impact of the ending of the one or more drag-torque-reducing measures on the overall torque of the hybrid drive is at least partially or entirely compensated. It is thus possible for the drag-torque-reduced, unfired operation of a combustion motor to be implemented, and in particular ended again, in a comfortable manner.

The control unit may be configured to ascertain a course with respect to time with which the drag torque of the combustion motor changes upon ending of the one or more drag-torque-reducing measures. The torque effected by the electric machine for the at least partial compensation of the additional drag torque may then be adapted in a manner dependent on the course with respect to time of the drag torque of the combustion motor, in particular in a complementary manner. The compensation of the change of the drag torque is thus possible in a particularly precise manner. Here, the course with respect to time of the drag torque may be ascertained in advance (for example by measurements) and stored as characteristic data.

The control unit may be configured to, following the ending of the one or more drag-torque-reducing measures, cause the combustion motor to be fired such that a base torque is effected by the combustion motor. The commencement of firing of the combustion motor thus results in a transition from the full drag torque to the base torque. This transition can be perceived as unpleasant by a user of the hybrid drive (for example because the transition leads to a vehicle being driven even though no variation of the accelerator pedal of the vehicle has been performed).

The electric machine can then be caused to at least partially compensate the base torque and/or at least partially compensate the transition from the drag torque to the base torque of the combustion motor. In particular, the electric machine can cause a course with respect to the time of the torque which is at least partially complementary to the transition from the drag torque to the base torque of the combustion motor. Thus, the comfort upon departure from the drag-torque-reduced, unfired operation of a combustion motor can be further increased.

The control unit may be configured to effect one or more torque-reducing measures for reducing the (if appropriate lowest or lowest possible fired) base torque of the combustion motor. Here, the one or more torque-reducing measures may in particular comprise a variation of the ignition time (gasoline motor), of the injection quantity (diesel motor) and/or of one or more fuel injection parameters of the combustion motor. Through the reduction of the base torque, the difference between the drag torque and the (if appropriate lowest fired) base torque of the combustion motor can be reduced. As a consequence of this, the torque range that must be provided and thus possibly kept in reserve by the electric machine for compensation purposes can be reduced. Through reduction of the torque reserve of the electric machine that is kept in reserve for the departure from drag-torque-reduced, unfired operation of the combustion motor, the usage possibilities of the electric machine during the drag-torque-reduced, unfired operation of the combustion motor, and thus the energy efficiency of the hybrid drive, can be increased.

Alternatively or in addition, the control unit may be configured to ascertain a (if appropriate maximum or maximum possible) compensation torque that can be provided by the electric machine. In particular, upon commencement of the process for departing from the drag-torque-reduced, unfired operation of the combustion motor, it may be ascertained what torque range of the electric machine is available for compensation purposes. Said torque range may be considered as an available compensation torque.

Then, in a manner dependent on the available or providable compensation torque of the electric machine, one or more torque-reducing or torque-increasing measures for reducing or for increasing the base torque of the combustion motor may be effected. For example, the base torque may be increased if a relatively high compensation torque is available. It can thus be effected that the combustion motor, upon commencement of firing, is operated directly at an operating point with relatively high efficiency (which leads to increased energy efficiency of the hybrid drive). For example, in a manner dependent on the available compensation torque, the combustion motor may be transferred into operation with firing of all cylinders or only with firing of a certain subset of the cylinders of the combustion motor.

The base torque of the combustion motor may be reduced if only a relatively low compensation torque of the electric machine is available (for example because only a relatively low torque reserve of the electric machine has been taken into consideration during the drag-torque-reduced, unfired operation of the combustion motor). Thus, the duration of the drag-torque-reduced, unfired operation of the combustion motor can be lengthened (which leads to increased energy efficiency of the hybrid drive).

The control unit may be configured to, following the resumption of the fired operation of the combustion motor, determine a demanded drive torque (for example a drive torque demanded by a driver of a vehicle). The drive torque may then be divided into a torque to be imparted by the combustion motor and/or a torque to be imparted by the electric machine. Energy-efficient operation of the hybrid drive can thus be made possible.

The control unit may be configured to (during the drag-torque-reduced, unfired operation of the combustion motor) determine whether or not a demanded drive torque can be imparted by the electric machine, taking into consideration the torque reserve of the electric machine for the at least partial compensation of the course with respect to the time of the torque of the combustion motor upon departure from the drag-torque-reduced, unfired operation of the combustion motor. Then, the commencement of fired operation of the combustion motor may be prepared, and/or the departure from the drag-torque-reduced, unfired operation of the combustion motor initiated, if it is determined that the demanded drive torque cannot be imparted by the electric machine. On the other hand, the drag-torque-reduced, unfired operation may be continued if appropriate. Reliable and comfortable operation of a hybrid drive is thus made possible.

The control unit may thus be configured to ascertain the course with respect to the time of the torque effected by the combustion motor proceeding from the drag-torque-reduced, unfired operation to fired operation. Said course may be ascertained in advance (for example experimentally) and stored as characteristic data. The course with respect to the time of the torque to be effected by the electric machine may then be ascertained, or have been ascertained, in a manner dependent on the course with respect to the time of the torque effected by the combustion motor, in particular such that a continuous course with respect to the time of the overall torque of the hybrid drive is obtained. A demanded drive torque for the hybrid drive may also be taken into consideration in the ascertainment of the course with respect to the time of the torque to be effected by the electric machine. It is thus possible for energy-efficient operation of a hybrid drive to be made possible in a comfortable manner.

According to a further aspect, a road-going motor vehicle, in particular a passenger motor vehicle or a heavy goods vehicle or a bus or a motorcycle, is described which comprises the control unit described in this disclosure.

According to a further aspect, a method for operating a hybrid drive having a combustion motor and an electric machine upon departure from the drag-torque-reduced, unfired operation of the combustion motor is described. The method comprises ending one or more drag-torque-reducing measures of the combustion motor in preparation for a commencement of fired operation of the combustion motor. Furthermore, the method comprises operating the electric machine in order to at least partially or entirely compensate an increase of the drag torque of the combustion motor that is effected as a result of the ending of the one or more drag-torque-reducing measures.

According to a further aspect, a software program is described. The software program may be configured to be executed on a processor (for example on a control unit of a vehicle) and to thus carry out the method described in this disclosure.

According to a further aspect, a memory medium is described. The memory medium may comprise a software program which is configured to be executed on a processor and to thus carry out the method described in this disclosure.

It is to be noted that the methods, devices and systems described in this disclosure may be used both on their own and in combination with other methods, devices and systems described in this disclosure. Furthermore, any aspects of the methods, devices and systems described in this disclosure may be combined with one another in a variety of ways. In particular, the features of the claims may be combined with one another in a variety of ways.

The invention will be described in more detail below on the basis of exemplary embodiments shown in the figures.

DETAILED DESCRIPTION OF THE DRAWINGS

Figure 1A:
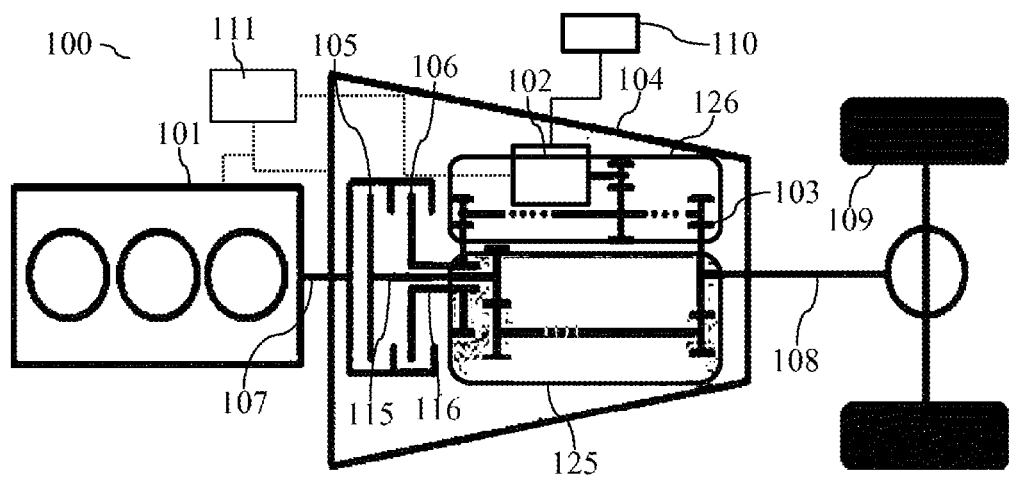
FIG. 1a shows an exemplary hybrid drive of a vehicle having a dual clutch transmission.

As presented in the introduction, the present disclosure is concerned with the operation of a hybrid drive, in particular upon the ending of one or more drag-torque-reducing measures. In this context, FIGS. 1a, 1b, 1c and 1d show block diagrams of exemplary hybrid drives for a vehicle 100. A hybrid drive comprises a combustion motor 101 and an electric machine 102, which can be utilized individually or jointly to generate a drive torque for the vehicle 100. The combustion motor 101 and the electric machine 102 are arranged such that the torques generated by the respective drive motor add together to give an overall drive torque, which is transmitted for example via a transmission 104 and an output shaft 108 of the transmission 104 to one or more wheels 109 of the vehicle 100. The electrical energy for the operation of the electric machine 102 may be stored in an electrical energy store 110.

The vehicle 100 furthermore comprises a control unit 111 (for example a motor control unit) which is configured to determine a demanded overall drive torque. The demanded overall drive torque may be specified by a driver of the vehicle for example by way of an accelerator pedal and/or by way of a setting of the transmission 104. For example, a driver may actuate the accelerator pedal in order to demand an increased overall drive torque. The control unit 111 may be configured to divide up the demanded overall drive torque into a first torque (for the combustion motor 101) and a second torque (for the electric machine 102). In other words, the control unit 111 may be configured to operate the combustion motor 101 and the electric machine 102 in a manner dependent on a demanded overall drive torque.

In the example illustrated in FIG. 1a, the vehicle 100 comprises a dual clutch transmission 104 which has a first clutch 105 which is configured to couple the drive shaft 107 of the combustion motor 101 to a first input shaft 115, to form a first partial transmission 125 of the transmission 104, or to decouple said drive shaft from said first input shaft. Furthermore, the transmission 104 has a second clutch 106 which is configured to couple the drive shaft 107 of the combustion motor 101 to a second input shaft 116, to form a second partial transmission 126 of the transmission 104, or to decouple said drive shaft from said second input shaft.

The first input shaft 115 and the second input shaft 116 are typically coaxial with respect to one another. In particular, the first input shaft 115 may be a solid shaft which is surrounded by the second input shaft 116 in the form of a hollow shaft. The first input shaft 115 may be coupled via the first partial transmission 125, and a gear ratio set therein, to the output shaft 108. Furthermore, the second input shaft 115 may be coupled via the second partial transmission 126, and a gear ratio set therein, to the output shaft 108. For example, the odd-numbered gear ratios (for example 1, 3, 5 etc.) may be provided by the first partial transmission 125 and the even-numbered gear ratios (for example 2, 4, 6 etc.) may be provided by the second partial transmission 126. The first and/or second partial transmissions 125, 126 typically have one or more shift elements 103 by way of which the various gear ratios of the respective partial transmission 125, 126 can be engaged in automated fashion and/or by way of which the respective partial transmission 125, 126 can be placed into a neutral position (without any gear ratio engaged). In a neutral position, it is typically the case that the input shaft 115, 116 of a partial transmission 125, 126 is decoupled from the output shaft 108.

The electric machine 102 of the hybrid drive may, in an efficient manner in terms of structural space, be couplable to one or both of the two partial transmissions 125, 126, or may be connected to only one of the two partial transmissions 125, 126. In particular, the electric machine 102 may be couplable directly to the input shaft 115, 116 of one of the two partial transmissions 125, 126. Furthermore, the electric machine 102 may be arranged such that coupling to the input shaft 115, 116 of the respective other partial transmission 125, 126 is possible only by way of the clutches 105, 106.

Figure 1B:
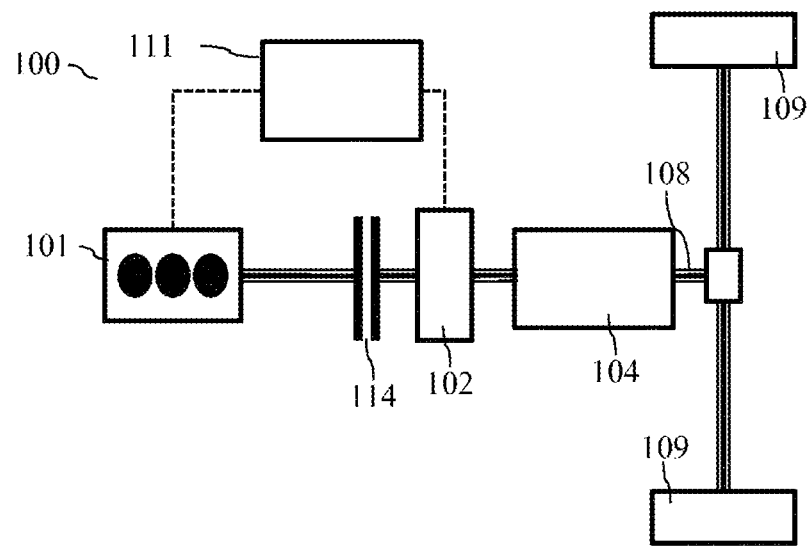
FIG. 1b shows an exemplary parallel hybrid drive with separating clutch.

FIG. 1b shows a vehicle 100 with a parallel hybrid drive, in which the drive torques of the two motors 101, 102 act additively on the common input shafts of the transmission 104. Furthermore, FIG. 1b shows a clutch 114 by way of which the transmission 104 can be decoupled from the combustion motor 101.

Figure 1C:
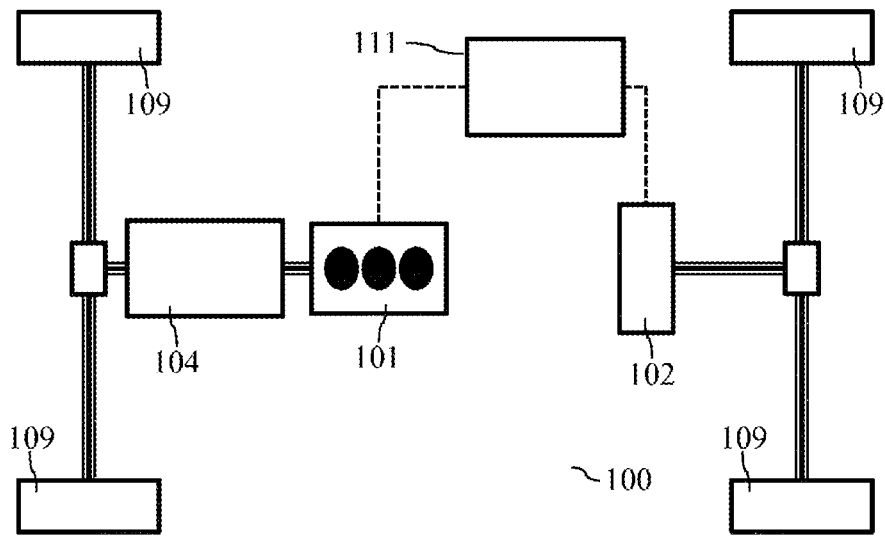
FIG. 1c shows an exemplary axle hybrid drive.

FIG. 1c shows a vehicle 100 with an axle hybrid drive, in which the combustion motor 101 and the electric machine 102 drive different axles of the vehicle 100. In other words, the drive torques of the two motors 101, 102 act on different axles of the vehicle 100.

Figure 1D:
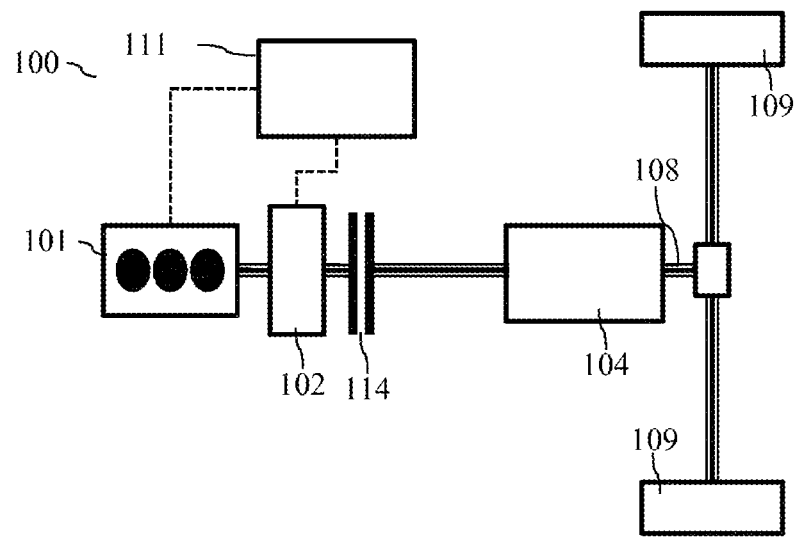
FIG. 1d shows an exemplary hybrid drive with a P1 architecture (without a separating clutch between combustion motor and electric machine).

FIG. 1d shows a vehicle 100 with a parallel hybrid drive with a P1 architecture, in which the electric machine 102 acts directly on the crankshaft 107 without the presence of a separating clutch situated between electric machine 102 and combustion motor 101.

The combustion motor 101 of a hybrid drive can be at least intermittently deactivated, for example in the case of (possibly purely) electric operation of the hybrid drive and/or if the one or more wheels 109 of the vehicle 100 are driving the output shaft 108. The drive shaft 107 of the deactivated combustion motor 101 can thus, in unfired cranked operation, be driven and/or concomitantly rotated by the electric machine 102 and/or by the one or more wheels 109 of the vehicle 100. Unfired cranked operation of the combustion motor 101 has the advantage that the combustion motor 101 can be rapidly and efficiently fired again in order to contribute drive torque for the overall drive of the vehicle 100. However, the cranking of the combustion motor 101 by the electric machine 102 and/or by one or more wheels 109 of the vehicle 100 leads to relatively high cranking losses.

To reduce the drag torque of the combustion motor 101, one or more drag-torque-reducing measures can be implemented. For example, one or more cylinders of the combustion motor 101 can be deactivated. Alternatively or in addition, the opening and/or closing angles and/or the valve lift of the inlet and/or outlet valves of the combustion motor 101 can be adapted in order to reduce the drag torque. For a commencement of fired operation of the combustion motor 101, it is however typically necessary that, in preparation for the commencement of fired operation, the one or more drag-torque-reducing measures are ended again.

The unfired cranked operation of the combustion motor 101 can thus be implemented such that a transition from the unfired cranked operation of the combustion motor 101 to fired operation of the combustion motor 101 is possible. The unfired cranked operation however results in a relatively high drag torque of the combustion motor 101 and thus relatively high losses. Alternatively, an operating mode with one or more drag-torque-reducing measures may be selected. This drag-torque-reduced, unfired, cranked operation of the combustion motor 101 can have the effect that, upon a transition to combustion operation of the combustion motor 101, the drag torque thereof briefly increases, owing to the transition via the unfired cranked operation required for this, before a switch can subsequently be made to fired operation. Furthermore, the departure from the unfired cranked operation can have the effect that, upon the commencement of firing of the combustion motor 101, a positive drive torque is immediately generated, which can be perceived as uncomfortable by the driver of a vehicle 100 and should therefore be compensated by the electric machine 102. For the compensation of the briefly increased drag torque, an additional torque reserve can be kept in reserve by the electric machine 102.

For the departure from drag-torque-optimized overrun cut-off of the combustion motor 101, the opening and/or closing angles and/or the valve lift of the inlet and/or outlet valves of the combustion motor 101 can be controlled such that the minimal fired base torque of the combustion motor 101 does not exceed the generator torque that can be provided by the electric machine 101 with regard to the demanded crankshaft torque at the combustion motor 101. During the fading-in of the fired operation of the combustion motor 101, the electric machine 102 can compensate the base torque such that the resulting drive torque of the hybrid drive continues to correspond to the driver demand. After reactivation of the combustion motor 101, the overall drive torque can again be distributed between the electric machine 102 and the combustion motor 101 in a standard manner.

Figure 2:
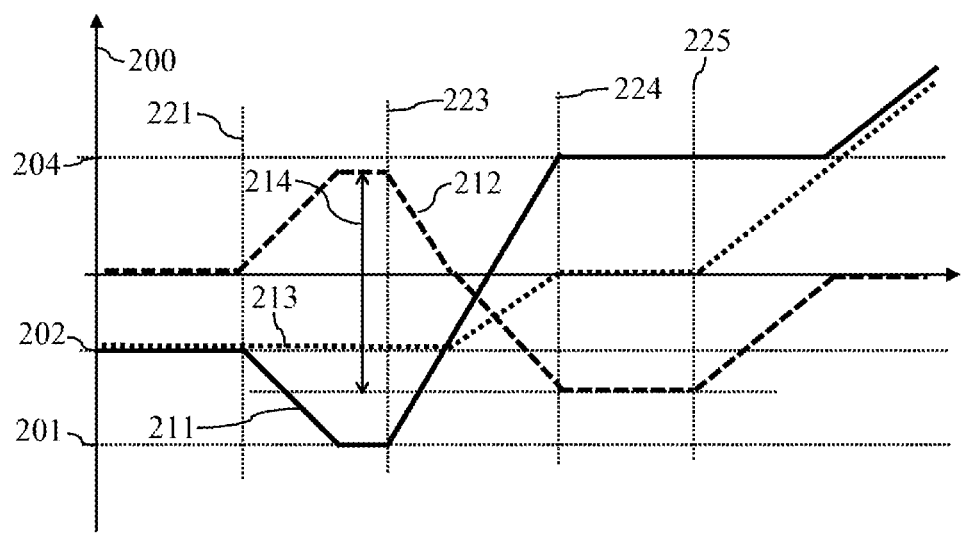
FIG. 2 shows an exemplary profile with respect to the time of the torque of a combustion motor upon departure from drag-torque-reduced, unfired operation of the combustion motor.

FIG. 2 shows an exemplary course 211 of the torque 200 of a combustion motor 101. Here, the combustion motor 101 has, in unfired operation, a full drag torque 201 or, in the event of activation of one or more drag-torque-reducing measures, a reduced drag torque 202. Drag-reduced, unfired operation may be departed at a time 221. The one or more drag-torque-reducing measures may be ended then, which leads to an increase of the drag torque to the full drag torque 201. Synchronously with the ending of the one or more drag-torque-reducing measures, the electric machine 102 may be caused to generate a positive torque 200 (see course 212), such that the increase of the drag torque of the combustion motor 101 is at least partially or preferably entirely compensated. The result is then the overall torque according to the torque course 213, which acts on the one or more wheels 109.

It is pointed out that FIG. 2 illustrates only the additional torque that is imparted by the electric machine 102 for the purposes of compensation upon the ending of the drag-torque-reduced, unfired operation of the combustion motor 101. Over and above this, the electric machine 102 may impart a drive torque which can be superposed on the course with respect to course 212 illustrated in FIG. 2.

At the time 223, the fired operation of the combustion motor 101 may be started (after ending of the one or more drag-torque-reducing measures), whereby a positive base torque 204 is typically generated by the combustion motor 101. The fired operation of the combustion motor 101 thus typically leads to a positive minimum or base torque 204. The electric machine 102 can be utilized to at least partially and preferably entirely compensate this positive base torque 204, by virtue of the electric machine 102 being operated as a generator (see course 212 between time 223 and time 224).

At the time 225, a (possibly additional) positive drive torque may be demanded by a user of the hybrid drive, in particular by a driver of the vehicle 100 (for example by actuation of the accelerator pedal). The negative compensation torque effected by the electric machine 102 can then be reduced (for example to zero), as illustrated by way of example in FIG. 2. Furthermore, the overall drive torque may be divided up between the electric machine 102 and/or the combustion motor 101.

The commencement of fired operation of the combustion motor 101 may be performed such that the positive base torque 204 is as far as possible only so low that the base torque 204 can be compensated by the electric machine 102 by way of a generator torque, and the electrical power generated in the process can be accommodated by the electrical energy store 110. In particular, the ignition of the combustion motor may take place relatively late (be "retarded") in order to reduce the base torque 204 generated by the combustion motor 101. As a consequence, the reserve 214 for the electric machine 102, which must be kept in reserve in order to allow a uniform transition from the drag-torque-reduced, unfired operation to the fired operation of the combustion motor 101, can also be reduced. Here, firing of all cylinders or only of a certain subset of the cylinders may commence, whereby different base torque courses can be generated.

Figure 3:
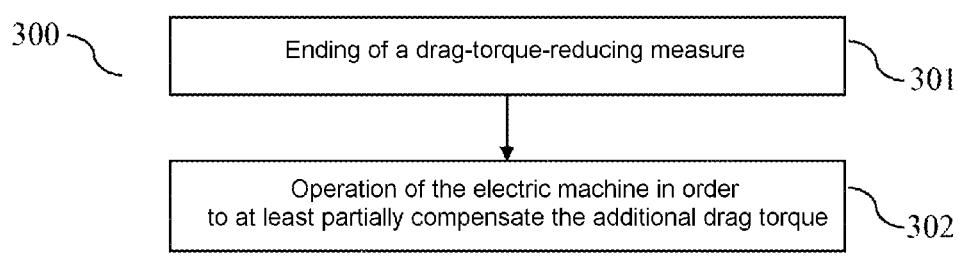
FIG. 3 shows a flow diagram of an exemplary method for operating a hybrid drive upon the ending of a drag-torque-reducing measure.

FIG. 3 shows a flow diagram of an exemplary method 300 for the operation of a hybrid drive, in particular upon departure from a drag-torque-optimized overrun cut-off or upon departure from drag-torque-reduced, unfired operation of the combustion motor 101. The method 300 may be carried out by a control unit 111 of a hybrid drive or of a vehicle 100.

The method 300 comprises the ending 301 of one or more drag-torque-reducing measures of the combustion motor 101 in preparation for a commencement of fired operation of the combustion motor 101. Here, the one or more drag-torque-reducing measures may be such that the one or more drag-torque-reducing measures must be ended before the combustion motor 101 can be fired again, that is to say before fuel can be injected into the combustion motor 101 again in order to cause at least a base torque 204.

Furthermore, the method 300 comprises the operation 302 of the electric machine 102 in order to at least partially or possibly entirely compensate the increase of the drag torque of the combustion motor 101 caused as a result of the ending of the one or more drag-torque-reducing measures.

By way of the aspects described in this disclosure, the required torque reserve 214 in the electric machine 102 for the departure from unfired operation of the combustion motor 101 can be reduced. The reduced torque reserve 214 in the electric machine 102 makes it possible to maintain the unfired operation of the combustion motor 101 with a relatively low drag torque for a longer period of time because, owing to the reduced torque reserve 214, the electric machine 102 can provide more power for the driving task and, furthermore, during recuperation operation, charges more energy into the electrical store 110. Alternatively or in addition, it may be effected that the combustion motor 102, after the departure from overrun cut-off, starts with a higher base torque 204 and thus exhibits improved efficiency, which reduces the overall consumption of the hybrid drive.

The present invention is not restricted to the exemplary embodiments shown. In particular, it is to be noted that the description and the figures are intended merely to illustrate the principle of the proposed methods, devices and systems.

What is claimed is:

1. A control unit for a hybrid drive comprising a combustion motor and an electric machine, wherein the control unit is configured to:

cause one or more drag-torque-reducing measures of the combustion motor to be ended in preparation for a commencement of fired operation of the combustion motor; and cause the electric machine to at least partially compensate an increase of a drag torque of the combustion motor that is effected as a result of ending the one or more drag-torque-reducing measures.

2. The control unit according to claim 1, wherein:

a first additional drag torque of the combustion motor is effected as a result of the ending of the one or more drag-torque-reducing measures; and the control unit is further configured to cause the electric machine to increase a torque effected by the electric machine by a value between 50% and 100% of the first additional drag torque.

3. The control unit according to claim 2, wherein the value is 100% of the first additional drag torque.

4. The control unit according to claim 2, wherein the control unit further is configured to:

ascertain a course with respect to time with which the drag torque of the combustion motor changes upon the ending of the one or more drag-torque-reducing measures; and adapt the torque effected by the electric machine for at least partial compensation of the additional drag torque in a manner dependent on the course with respect to time.

5. The control unit according to claim 1, wherein the control unit is further configured to:

following the ending of the one or more drag-torque-reducing measures, cause the combustion motor to be fired such that a base torque is effected by the combustion motor; and cause the electric machine to at least one of:

at least partially compensate the base torque, or at least partially compensate a transition from the drag torque to the base torque of the combustion motor.

6. The control unit according to claim 5, wherein:

the control unit is further configured to effect one or more torque-reducing measures for reducing the base torque of the combustion motor; and the one or more torque-reducing measures comprise a variation of an ignition time for an ignition of the combustion motor.

7. The control unit according to claim 5, wherein the control unit is further configured to:

ascertain a compensation torque that is provided by the electric machine; and effect one or more torque-reducing measures for reducing the base torque or one or more torque increasing measures for increasing the base torque based on the compensation torque.

8. The control unit according to claim 5, wherein the control unit is further configured to:

following a resumption of the fired operation of the combustion motor, determine a demanded drive torque; and divide the demanded drive torque into a torque to be imparted by the combustion motor and a torque to be imparted by the electric machine.

9. The control unit according to claim 1, wherein the control unit is further configured to:

determine whether a demanded drive torque is impartable by the electric machine, based at least in part on a torque reserve for at least partial compensation of a course with respect to time of a torque effected by the combustion motor upon departure from drag-torque-reduced, unfired operation of the combustion motor; and at least one of prepare the commencement of the fired operation of the combustion motor or cause the departure from the drag-torque-reduced, unfired operation of the combustion motor if it is determined that the demanded drive torque cannot be imparted by the electric machine.

10. The control unit according to claim 1, wherein the control unit is further configured to:

ascertain a first course with respect to time of a torque effected by the combustion motor proceeding from a drag-torque-reduced and unfired operation to a fired operation; and ascertain a second course with respect to time of a torque to be effected by the electric machine in a manner dependent on the first course with respect to time of the torque effected by the combustion motor such that a continuous course with respect to time of an overall torque is obtained.

11. The control unit according to claim 1, wherein the one or more drag-torque-reducing measures comprise at least one of:

a deactivation of one or more cylinders of the combustion motor;

an adaptation of at least one of opening or closing angles of at least one of an inlet valve or an outlet valve of the combustion motor; or an adaptation of an opening stroke of at least one of an inlet valve or an outlet valve of the combustion motor.

12. A method for operating a hybrid drive having a combustion motor and an electric machine upon departure from drag-torque-reduced, and unfired operation of the combustion motor, the method comprising:

ending one or more drag-torque-reducing measures of the combustion motor in preparation for a commencement of fired operation of the combustion motor; and operating the electric machine in order to at least partially compensate an increase of a drag torque of the combustion motor that is effected as a result of the ending of the one or more drag-torque-reducing measures.

* * * * *